(12) United States Patent
Cruson

(10) Patent No.: US 10,627,029 B2
(45) Date of Patent: Apr. 21, 2020

(54) HOSE CLAMP WITH INTEGRAL CLAWS

(71) Applicant: Tread Enterprises Ltd, Abbotsford (CA)

(72) Inventor: Brian Cruson, Abbotsford (CA)

(73) Assignee: Tread Enterprises Ltd., Abbotsford (CA)

( * ) Notice: Subject to any disclaimer, the term of this patent is extended or adjusted under 35 U.S.C. 154(b) by 176 days.

(21) Appl. No.: 15/784,606

(22) Filed: Oct. 16, 2017

(65) Prior Publication Data

US 2019/0049047 A1    Feb. 14, 2019

Related U.S. Application Data

(60) Provisional application No. 62/544,257, filed on Aug. 11, 2017.

(51) Int. Cl.
| | |
|---|---|
| *F16L 33/04* | (2006.01) |
| *F16L 3/12* | (2006.01) |
| *F16L 33/08* | (2006.01) |
| *A01C 7/20* | (2006.01) |
| *F16L 33/32* | (2006.01) |

(52) U.S. Cl.
CPC .............. *F16L 33/04* (2013.01); *F16L 3/1211* (2013.01); *F16L 33/08* (2013.01); *A01C 7/206* (2013.01); *F16L 33/32* (2013.01)

(58) Field of Classification Search
CPC . F16L 33/04; F16L 33/06; F16L 33/08; F16L 25/04; Y10T 24/1427; Y10T 24/1441; Y10T 24/1443

USPC ......................................... 285/253, 252, 420
See application file for complete search history.

(56) References Cited

U.S. PATENT DOCUMENTS

| | | | | |
|---|---|---|---|---|
| 3,407,448 A | * | 10/1968 | Tetzlaff .................... | F16L 33/10 24/19 |
| 2008/0098575 A1 | * | 5/2008 | Krauss ..................... | F16L 33/08 24/279 |
| 2008/0244876 A1 | * | 10/2008 | Chen ........................ | F16L 33/08 24/274 R |
| 2009/0019673 A1 | * | 1/2009 | Rigollet .................... | B25B 7/02 24/278 |
| 2009/0139062 A1 | * | 6/2009 | Ryhman ................... | F16L 33/08 24/20 LS |
| 2010/0058563 A1 | * | 3/2010 | Col .......................... | F16L 33/08 24/279 |
| 2011/0005040 A1 | * | 1/2011 | Col .......................... | F16L 33/08 24/16 R |
| 2013/0174385 A1 | * | 7/2013 | Saunders ................. | F16L 33/08 24/279 |
| 2018/0259104 A1 | * | 9/2018 | Hielscher ................ | F16L 33/08 |

* cited by examiner

*Primary Examiner* — Aaron M Dunwoody
(74) *Attorney, Agent, or Firm* — Ryan W. Dupuis; Ade & Company Inc.; Kyle R. Satterthwaite

(57) ABSTRACT

A hose clamp, for clamping a pneumatic seed delivery hose within a slotted receiver tube of an agricultural seed boot, including a clamping band with thread elements for cooperation with a bolt within a fastener housing at one end of the clamping band to be clamped circumferentially about the hose within the receiver tube. A set of claws are spaced apart from one another along opposing sides of the fastener housing for penetration into the pneumatic seed delivery hose when clamping the hose within the receiver tube.

12 Claims, 2 Drawing Sheets

HOSE CLAMP WITH INTEGRAL CLAWS

This application claims the benefit under 35 U.S.C. 119(e) of U.S. provisional application Ser. No. 62/544,257, filed Aug. 11, 2017.

FIELD OF THE INVENTION

The present invention relates to a hose clamp comprising a clamping band and a threaded bolt supported in a fastener housing at one end of the clamping band for meshing engagement with thread elements along the band to vary a circumference of the clamping band about a hose, and more particularly the present invention relates to a hose clamp including claws fixed onto the fastener housing for penetration into the hose being clamped.

BACKGROUND

A conventional hose clamp design includes a clamping band and a threaded bolt supported in a fastener housing at one end of the clamping band for meshing engagement with thread elements along the band to vary a circumference of the clamping band about a hose.

In agricultural application, it is common to make use of a conventional hose clamp to secure a flexible seed delivery hose within a rigid receiver tube. The receiver tube typically has a clamp opening formed in one side of the receiver tube at a location spaced axially inward from an end of the tube so that tightening a hose clamp about the receiver tube at the clamp opening results in clamping of the hose against an inner wall surface of the rigid tube at a location diametrically opposed from the clamp opening that receives a portion of the hose clamp therein. Overtightening of the hose clamp in this instance can crush the flexible seed delivery hose and constrict the pneumatic delivery of seed through the hose. Limiting the clamping force of the hose clamp to prevent the crushing of the hose however can commonly result in an insufficient amount of frictional clamping of the hose within the receiver tube such that the hose may have a tendency to come loose from the hose clamp over time when subjected to the normal vibrations that agricultural equipment may be subjected to with use.

SUMMARY OF THE INVENTION

A hose clamp for being clamping about a hose, the hose clamp comprising:

a clamping band extending in a circumferential direction about a central axis of the clamping band between a first end and a second end of the clamping band;

a plurality of thread elements formed at circumferentially spaced locations along an intermediate portion of the clamping band between the first and second ends of the clamping band;

a fastener housing mounted in fixed relation onto the first end of the clamping band;

the intermediate portion of the clamping band being slidably received in the circumferential direction through a passage in the fastener housing;

a bolt supported within the fastener housing, the bolt being rotatable relative to the fastener housing about a bolt axis oriented tangentially to the central axis of the clamping band;

threads formed on the bolt in meshing engagement with the thread elements formed on the intermediate portion of the clamping band passing through the passage in the fastener housing;

the first and second ends of the clamping band being movable relative to one another in the circumferential direction to vary an inner circumference of the clamping band defined by an inner surface of the clamping band while the bolt is rotated within the fastener housing; and at least one claw fixed onto the fastener housing and protruding radially inward beyond the inner surface of the clamping band that defines the inner circumference of the clamping band towards the central axis of the clamping band for gripping the hose.

Use of claws fixed onto the fastener housing of the hose allows the hose to be longitudinally fixed relative to the receiver tube in agricultural applications, even when a low clamping force is used to prevent crushing of the seed deliver hose.

Preferably said at least one claw tapered to a point so as to be adapted to be penetrated into the hose.

Preferably said at least one claw includes one claw supported at each one of a pair of axially opposing sides of the fastener housing.

According to one embodiment, said at least one claw includes one claw supported each one of a pair of circumferentially opposing ends of the fastener housing. Furthermore, there may be two circumferentially spaced apart claws supported at each one of a pair of axially opposing sides of the fastener housing.

Each claw may be formed integrally and seamlessly as a unitary body with at least one wall of the fastener housing receiving the bolt therein.

In the illustrated embodiment, each claw is formed of flat sheet metal lying in a plane oriented perpendicularly to the central axis of the clamping band.

The fastener housing may be formed as an integral, seamless, unitary body of sheet metal which collectively forms (i) two parallel and spaced apart sides walls of the housing which receive the bolt therebetween, (ii) an outer wall connected between the side walls at an outer side of the housing, and (iii) said at least one claw protruding inwardly from a respective one of the side walls.

The claws may be supported on the fastener housing to protrude outwardly from the fastener housing in the circumferential direction beyond two circumferentially opposing ends of the fastener housing respectively.

According to a second aspect of the present invention there is provided an agricultural seed delivery hose assembly comprising:

a receiver tube for delivering seed to a seed boot of an agricultural implement, the receiver tube including a clamp opening formed in a wall of the receiver tube at one side of the receiver tube at a location spaced axially along the receiver tube from an open end of the receiver tube;

a pneumatic seed delivery hose received in the open end of the receiver tube in overlapping relationship with the clamp opening;

a hose clamp secured about the receiver tube so as to be partially received within the clamp opening of the receiver tube;

the hose clamp clamping the pneumatic seed delivery hose against an inner surface of the receiver tube at a location diametrically opposed from the clamp opening;

the hose clamp comprising:

(i) a clamping band extending in a circumferential direction about a central axis of the clamping band between a first end and a second end of the clamping band;

(ii) a plurality of thread elements formed at circumferentially spaced locations along an intermediate portion of the clamping band between the first and second ends of the clamping band;

(iii) a fastener housing mounted in fixed relation onto the first end of the clamping band in alignment with the clamp opening in the receiver tube;

(iv) the intermediate portion of the clamping band being slidably received in the circumferential direction through a passage in the fastener housing;

(v) a bolt supported within the fastener housing, the bolt being rotatable relative to the fastener housing about a bolt axis oriented tangentially to the central axis of the clamping band;

(vi) threads formed on the bolt in meshing engagement with the thread elements formed on the intermediate portion of the clamping band passing through the passage in the fastener housing;

(vii) the first and second ends of the clamping band being movable relative to one another in the circumferential direction to vary a circumference of the clamping band while the bolt is rotated within the fastener housing; and (viii) at least one claw fixed onto the fastener housing and penetrated into the pneumatic seed delivery hose.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 2:
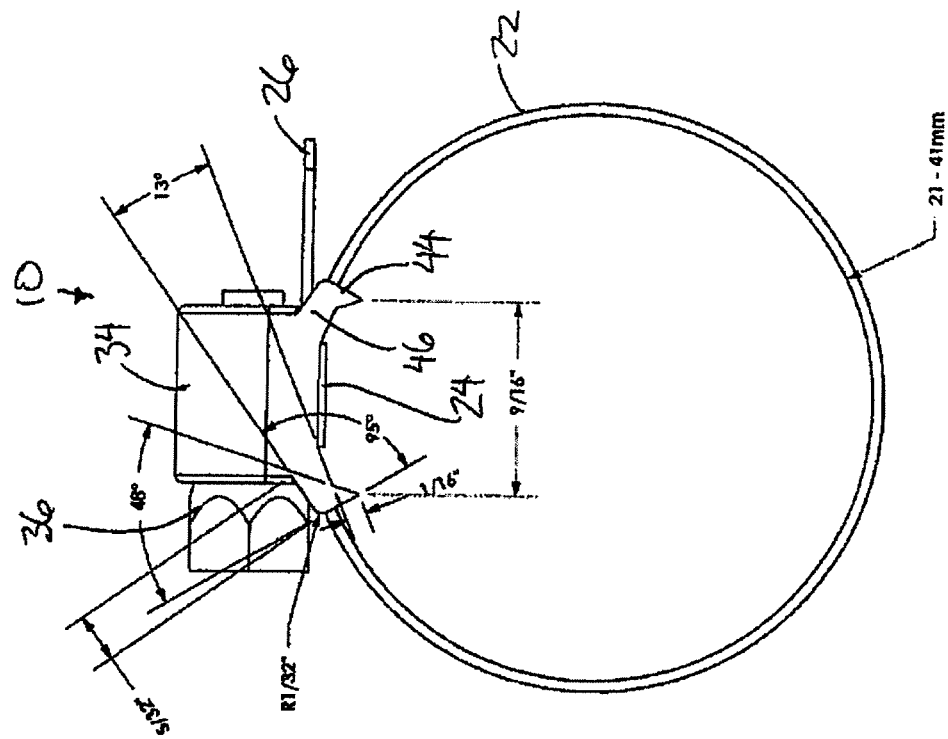
FIG. 2 is an end elevational view of the hose clamp according to FIG. 1.
Figure 1:
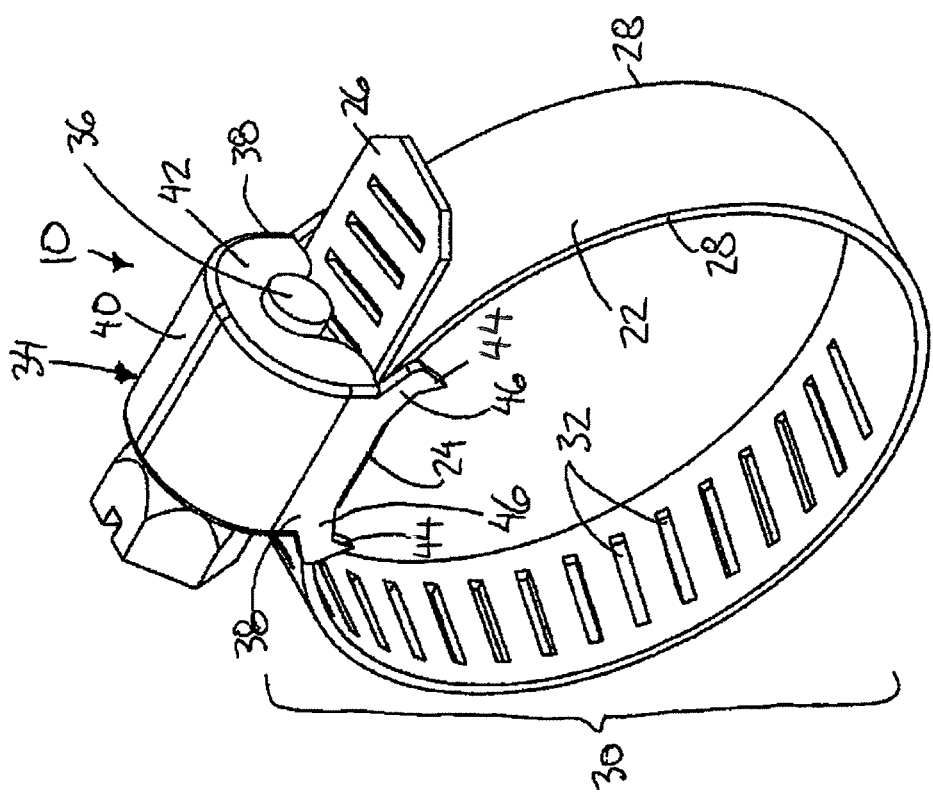
FIG. 1 is a perspective view of the hose clamp according to the present invention.

Referring to the accompanying Figures, there is illustrated a hose clamp generally indicated by reference numeral 10. The hose clamp 10 is intended for use in clamping a hose relative to another structure. In the illustrated embodiment, the hose clamp 10 is used for clamping a pneumatic seed delivery hose 14 to the receiver tube 16 of a seed boot of an agricultural seeding implement.

A typical agricultural seeding implement includes a frame supported for movement across the ground when connected to a towing vehicle. A plurality of seed boots supported on the frame form furrows in the ground and deposit seed into the furrows as the implement is displaced by the towing vehicle across the ground. Each seed boot includes a receiver tube 16 in the form of a rigid metal tube having an open top end 18 for receiving the seed delivery hose 14 therein. A clamp opening 20 is provided in the receiver tube at a side wall of the tube at a location spaced axially inwardly and downwardly from the open top end of the tube. The width of the clamp opening in the axial direction is arranged to be greater than the axial width of the hose clamp 10, while extending circumferentially partway about the circumference of the receiver tube, for example approximately halfway about the circumference in the illustrated embodiment.

The seed delivery hose is part of a seed delivery system of the agricultural seeding implement. The seed delivery system further includes a blower for generating a pneumatic flow through the seed delivery hoses, a manifold for distributing the flow across a plurality of seed delivery hoses to the seed boots, a seed tank for storing a source of seeds therein, and a seed meter for metering seed from the tank into the seed delivery hoses respectively. Each seed delivery hose is a flexible, resilient hose formed of plastic or rubber material having an outer diameter which is approximately equal to or slightly less than the interior diameter of the receiver tube 16. The end of the seed delivery hose is inserted through the open top end of the receiver boot so that the seed delivery hose fully overlaps the clamp opening 20 by locating the end of the seed hose spaced axially further inward than the clamp opening from the open top end of the receiver tube.

The hose clamp 10 is positioned about the receiver tube 16 in axial alignment with the clamp opening. In this manner tightening of the hose clamp effectively tightens a portion of the hose clamp against the portion of the seed delivery hose exposed at the clamp opening in the receiver tube for clamping the seed delivery hose 14 against a portion of an inner surface of the receiver tube that is at a location diametrically opposite from the clamp opening.

The hose clamp 10 includes a clamping band 22 which extends in a circumferential direction between a first end 24 and an opposing second end 26. The clamping band is formed of sheet metal which is flat between two opposing side edges 28 of the band. The first and second ends overlap one another in the circumferential direction such that the clamping band forms the shape of a collar extending circumferentially about a central axis of the clamping band. An intermediate portion 30 of the clamping band extends from the second end 26 partway towards the first end and locates a plurality of thread elements 32 thereon. The thread elements 32 comprise punched slots formed in the clamping band at evenly spaced apart positions in the circumferential direction.

A fastener housing 34 is fixed onto the first end of the clamping band to protrude outwardly therefrom. The fastener housing receives a bolt 36 rotatably therein such that the bolt is rotatable about a respective fastener axis oriented tangentially to the central axis of the clamping band. The fastener housing is primarily formed by a single, unitary body of sheet metal formed into a generally U-shaped configuration to define (i) two side walls 38 of the housing which are parallel and spaced apart from one another at the opposing side edges 28 of the band, and (ii) a curved outer wall 40 connected between the two side walls at the outer side of the fastener housing. Each side wall is thus joined to a respective side edge of the clamping band at the first end of the clamping band to extend radially outward therefrom to an outer end integrally joined with the outer wall 40.

The fastener housing 34 further includes two end walls 42 supported at circumferentially opposing ends of the housing so that each end wall is oriented perpendicularly to the fastener axis of the bolt. The two end walls serve to support the bolt rotatably thereon to extend axially of the bolt between the two end walls.

Each end wall 42 is supported to be spaced outwardly from the clamping band at the inner end thereof to define a slot between each end wall and the clamping band whereby the slots collectively define a through passage extending circumferentially through the fastener housing which receives the intermediate portion of the clamping band therethrough for relative sliding in the circumferential direction. As the intermediate portion is slid circumferentially relative to the fastener housing that is fixed at the first end of the clamping band, the amount of clamping band which overlaps upon itself will vary to effectively vary the inner circumference of the clamping band as defined by an inner surface of the clamping band.

The bolt 36 includes a head supported at one end thereof at a location externally of the housing and a threaded shaft supported within the housing between the end walls thereof. Suitable threads are provided on the bolt 36 for being matingly received with the thread elements 32 of the clamping band respectively. The spacing, the size, the orientation, and the shape of the slots forming the thread elements 32 are adapted to mate with the threads of the bolt 36. In this manner rotating the bolt about the fastener axis thereof causes sliding of the second end of the clamping band circumferentially relative to the first end of the clamping band by controlling the circumferential displacement of the intermediate portion of the clamping band through the fastener housing to vary the inner circumference of the band.

To grip the fastener housing relative to the seed delivery hose 14, four claws 44 are provided on the housing. Each claw is integral, unitary, and seamless together with the body of material forming the two side walls 38 and the outer wall 40 of the fastener housing. Two of the claws 44 are spaced apart circumferentially along each of the two axially opposing sides of the housing defined by the side walls 38. Each claw is in the form of a plate lying coplanar with the corresponding side wall with which it is integrally formed so as to be oriented generally perpendicularly to the central axis of the clamping band.

Figure 5:
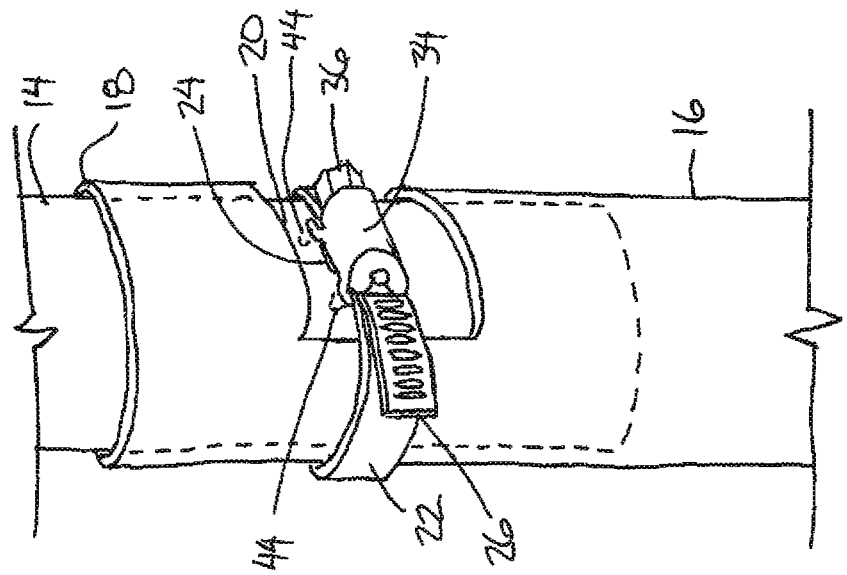
FIG. 5 is a perspective view of the hose clamp according to FIG. 1 shown clamping an agricultural seed delivery hose clamped within a receiver tube of an agricultural implement.
Figure 4:
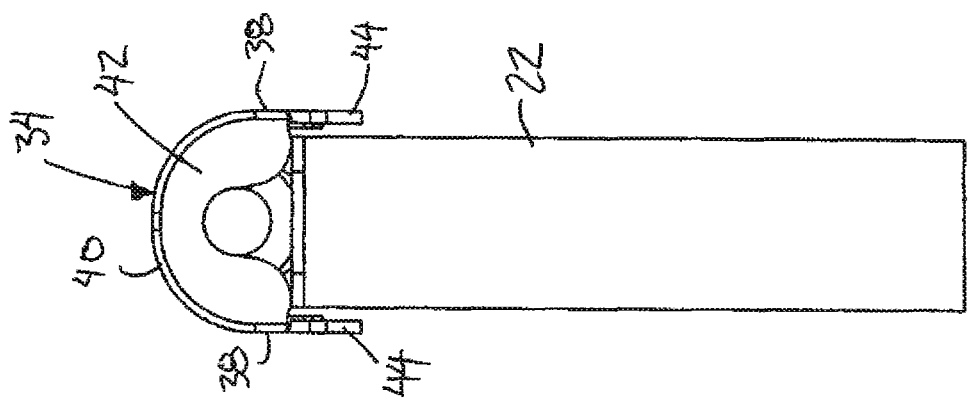
FIG. 4 is a side elevational view of the hose clamp according to FIG. 1.
Figure 3:
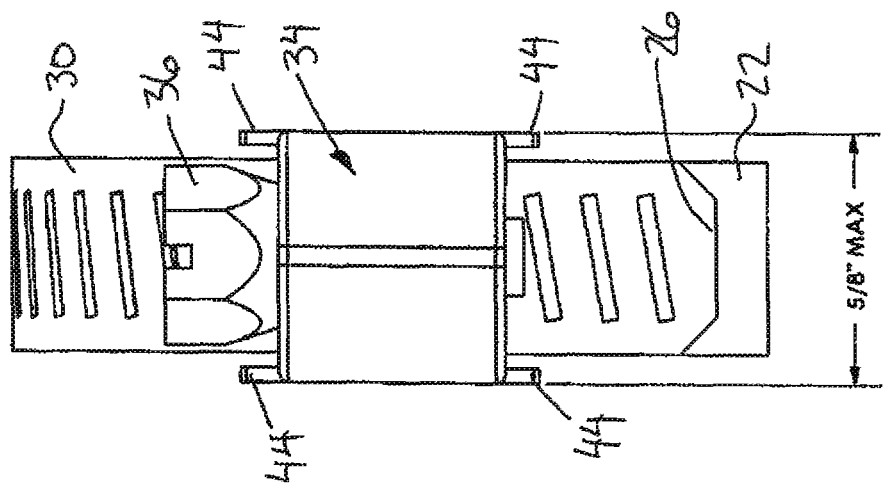
FIG. 3 is top plan view of the hose clamp according to FIG. 1.

Each claw 44 is supported on a respective leg 46 of material protruding circumferentially beyond the end wall of the housing within the plane of the corresponding claw and side wall of the housing. Each claw 44 extends downward from the outer end of the respective leg 46 so as to protrude radially inwardly beyond the inner surface of the clamping band towards the central axis of the clamping band and so as to be tapered radially inwardly towards an apex 47 located at an innermost end of the claw so as to be suitably arranged for penetration into an exterior surface of the resilient material forming the seed delivery hose 14 as shown in FIG. 5.

In use, the hose clamp is initially loosely supported about the receiver tube to enable the seed delivery hose to be inserted into the open top end of the receiver tube. The hose is inserted into the receiver tube such that the end of the hose is positioned axially beyond the clamp opening in the receiver tube. The hose clamp is then aligned axially with the clamp opening, while the fastener housing is aligned circumferentially with the fastener opening, so that the four claws 44 can engage the seed delivery hose through the clamp opening. Using a tool connected to the head of the bolt 36 to rotate the bolt serves to circumferentially slide the intermediate portion of the clamping band relative to the fastener housing to decrease the inner circumference of the clamping band sufficiently that the claws 44 which protrude radially inwardly beyond the inner surface of the clamping band serve to penetrate into the seed hose.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A hose clamp for being clamping about a hose, the hose clamp comprising:
   a clamping band extending in a circumferential direction about a central axis of the clamping band between a first end and a second end of the clamping band;
   a plurality of thread elements formed at circumferentially spaced locations along an intermediate portion of the clamping band between the first and second ends of the clamping band;
   a fastener housing mounted in fixed relation onto the first end of the clamping band;
   the intermediate portion of the clamping band being slidably received in the circumferential direction through a passage in the fastener housing;
   a bolt supported within the fastener housing, the bolt being rotatable relative to the fastener housing about a bolt axis oriented tangentially to the central axis of the clamping band;
   threads formed on the bolt in meshing engagement with the thread elements formed on the intermediate portion of the clamping band passing through the passage in the fastener housing;
   the first and second ends of the clamping band being movable relative to one another in the circumferential direction to vary an inner circumference of the clamping band defined by an inner surface of the clamping band while the bolt is rotated within the fastener housing; and
   at least one claw fixed onto the fastener housing and protruding radially inward beyond the inner surface of the clamping band that defines the inner circumference of the clamping band towards the central axis of the clamping band for gripping the hose;
   said at least one claw extending radially inwardly from the fastener housing towards an apex of the claw at an innermost end of the claw whereby said at least one claw is adapted to be penetrated into an outer surface of the hose.

2. The hose clamp according to claim 1 wherein said at least one claw is tapered radially inwardly towards the apex which is pointed so as to be adapted to be penetrated into the hose.

3. The hose clamp according to claim 1 wherein said at least one claw includes one claw supported at each one of a pair of axially opposing sides of the fastener housing.

4. The hose clamp according to claim 1 wherein said at least one claw includes one claw supported at each one of a pair of circumferentially opposing ends of the fastener housing.

5. The hose clamp according to claim 1 wherein said at least one claw includes two circumferentially spaced apart claws supported at each one of a pair of axially opposing sides of the fastener housing.

6. The hose clamp according to claim 1 said at least one claw is formed integrally and seamlessly as a unitary body with at least one wall of the fastener housing receiving the bolt therein.

7. The hose clamp according to claim 1 wherein said at least one claw is formed of flat sheet metal lying in a plane oriented perpendicularly to the central axis of the clamping band.

8. The hose clamp according to claim 1 wherein the fastener housing includes an integral, seamless, unitary body of sheet metal which collectively forms (i) two parallel and spaced apart sides walls of the housing which receive the bolt therebetween, (ii) an outer wall connected between the side walls at an outer side of the housing, and (iii) said at least one claw protruding inwardly from a respective one of the side walls.

9. The hose clamp according to claim 1 wherein said at least one claw comprises two claws supported on respective leas protruding outwardly in the circumferential direction beyond two circumferentially opposing end walls of the fastener housing respectively.

10. An agricultural seed delivery hose assembly comprising:
- a receiver tube for delivering seed to a seed boot of an agricultural implement, the receiver tube including a clamp opening formed in a wall of the receiver tube at one side of the receiver tube at a location spaced axially along the receiver tube from an open end of the receiver tube;
- a pneumatic seed delivery hose extending into the open end of the receiver tube up to an end of the hose positioned axially beyond the clamp opening in the receiver tube such that the hose is in overlapping relationship with the clamp opening;
- a hose clamp secured about the receiver tube so as to be partially received within the clamp opening of the receiver tube;
- the hose clamp clamping the pneumatic seed delivery hose against an inner surface of the receiver tube at a location diametrically opposed from the clamp opening;
- the hose clamp comprising:
  - (i) a clamping band extending in a circumferential direction about a central axis of the clamping band between a first end and a second end of the clamping band;
  - (ii) a plurality of thread elements formed at circumferentially spaced locations along an intermediate portion of the clamping band between the first and second ends of the clamping band;
  - (iii) a fastener housing mounted in fixed relation onto the first end of the clamping band in alignment with the clamp opening in the receiver tube;
  - (iv) the intermediate portion of the clamping band being slidably received in the circumferential direction through a passage in the fastener housing;
  - (v) a bolt supported within the fastener housing, the bolt being rotatable relative to the fastener housing about a bolt axis oriented tangentially to the central axis of the clamping band;
  - (vi) threads formed on the bolt in meshing engagement with the thread elements formed on the intermediate portion of the clamping band passing through the passage in the fastener housing;
  - (vii) the first and second ends of the clamping band being movable relative to one another in the circumferential direction to vary a circumference of the clamping band while the bolt is rotated within the fastener housing; and
  - (viii) at least one claw fixed onto the fastener housing and penetrated into an exterior surface of the pneumatic seed delivery hose.

11. The assembly according to claim 10 wherein said at least one claw extends radially inwardly towards an apex of the claw at an innermost end of the claw which is penetrated into the exterior surface of the pneumatic seed delivery hose.

12. The assembly according to claim 11 wherein said at least one claw is tapered radially inwardly towards the apex which is pointed.

* * * * *